United States Patent
Sampath et al.

(10) Patent No.: US 8,379,697 B2
(45) Date of Patent: Feb. 19, 2013

(54) SELF-INTERFERENCE CANCELLATION FOR MULTICHANNEL MODEMS

(75) Inventors: Hemanth Sampath, San Diego, CA (US); Dhananjay Ashok Gore, San Diego, CA (US); Vincent K. Jones, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 668 days.

(21) Appl. No.: 12/510,474

(22) Filed: Jul. 28, 2009

(65) Prior Publication Data

US 2011/0026567 A1 Feb. 3, 2011

(51) Int. Cl.
*H04B 1/38* (2006.01)

(52) U.S. Cl. .................... 375/219; 375/260; 375/346

(58) Field of Classification Search .................. None
See application file for complete search history.

(56) References Cited

U.S. PATENT DOCUMENTS

| | | | | |
|---|---|---|---|---|
| 6,535,748 | B1 * | 3/2003 | Vuorio et al. ............ | 455/552.1 |
| 2003/0081689 | A1 * | 5/2003 | Saito ........................ | 375/260 |
| 2005/0025270 | A1 * | 2/2005 | Muhammad et al. ......... | 375/346 |
| 2006/0072492 | A1 * | 4/2006 | Trainin .................. | 370/328 |
| 2007/0291884 | A1 * | 12/2007 | Frederick et al. ............ | 375/350 |
| 2009/0154427 | A1 * | 6/2009 | Lee et al. .................. | 370/335 |
| 2009/0154620 | A1 * | 6/2009 | Mostafa .................... | 375/346 |
| 2009/0243913 | A1 * | 10/2009 | Sekiguchi et al. ........... | 342/109 |

FOREIGN PATENT DOCUMENTS

WO  WO2009090400  7/2009

OTHER PUBLICATIONS

Eliezer Oeetal: "A Phase Domain Approach for Mitigation of Self-Interference i n Wireless Transceivers" IEEE Journal of Solid-State Circuits, IEEE Service Center, Piscataway, NJ, US,vol . 44, No. 5, May 1, 2009, pp. 1436-1453, XP011256791 ISSN: 0018-9200.
International Search Report and Written Opinion—PCT/US2010/043175, International Search Authority—European Patent Office—Oct. 21, 2010.

* cited by examiner

*Primary Examiner* — Leon-Viet Nguyen
(74) *Attorney, Agent, or Firm* — Kenyon S. Jenckes

(57) ABSTRACT

A method for detecting and reducing aliasing is described. The method may be implemented by a first wireless device. A first signal may be transmitted on a first frequency channel. A second signal may be received on a second frequency channel. The second signal may be received concurrently with the transmission of the first signal. Aliasing of the first signal on the second signal may be detected. Aliasing may be reduced.

28 Claims, 15 Drawing Sheets

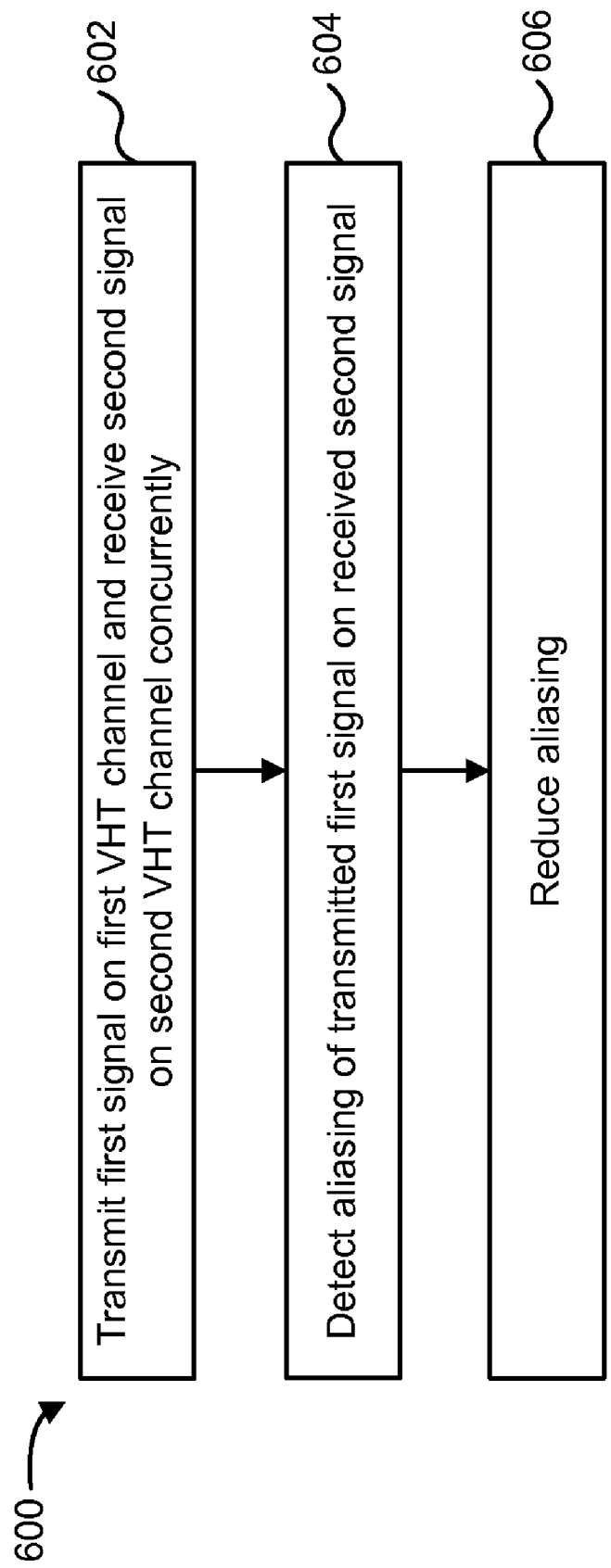

SELF-INTERFERENCE CANCELLATION FOR MULTICHANNEL MODEMS

TECHNICAL FIELD

The present disclosure relates generally to wireless communication systems. More specifically, the present disclosure relates to systems and methods for detecting and removing self-interference created by transmissions sent to a receiver in a multi-channel modem, as a result of the transmit waveform aliasing into the receiver waveform after analog to digital conversion.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. A wireless communication device may be referred to as a mobile station, a subscriber station, an access terminal, a remote station, a user terminal, a terminal, a subscriber unit, user equipment, etc. The term "subscriber station" will be used herein.

A wireless communication system may provide communication for a number of cells, each of which may be serviced by a base station. A base station may be a fixed station that communicates with mobile stations. A base station may alternatively be referred to as an access point, a modem, or some other terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station. A wireless communication system may simultaneously support communication for multiple subscriber stations.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and spatial division multiple access (SDMA).

The IEEE 802.11 group is currently looking into standardizing a new version of 802.11, under the name 802.11ac or the VHT (Very High Throughput) Task Group. In 802.11ac, more than 1 gigabits-per-second (Gbps) Medium Access Control (MAC) throughput may be achieved in the 5 gigahertz (GHz) band. Technologies are being considered in this group which use higher order multiple input multiple output (MIMO), SDMA, and OFDMA over multiple 20 megahertz (MHz) channels.

BRIEF DESCRIPTION OF THE DRAWINGS

FIG. 6 is a flow diagram illustrating a method for detecting and reducing aliasing;

DETAILED DESCRIPTION

Figure 1:
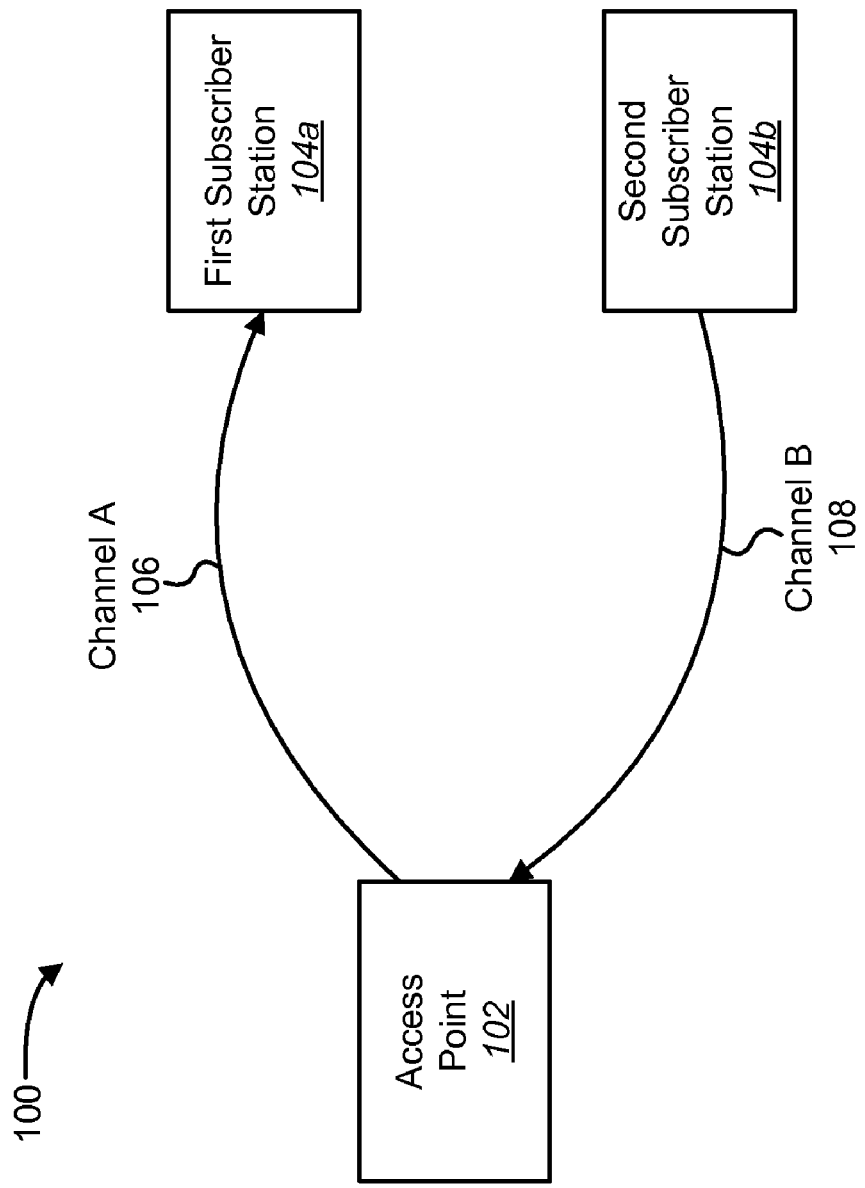
FIG. 1 illustrates a system including an access point in wireless electronic communication with multiple subscriber stations.

A method for detecting and reducing aliasing is described. The method may be implemented by a first wireless device. A first signal is transmitted on a first frequency channel. A second signal is received on a second frequency channel. The second signal may be received concurrently with the transmission of the first signal. Aliasing of the first signal on the second signal may be detected. Aliasing may be reduced.

The first frequency channel may be a very high throughput (VHT) channel that comprises one or more basic channels. Reducing aliasing may include determining the estimated channel from a transmitter of the first frequency channel to a receiver of the second frequency channel and cancelling the interference created by the transmitter of the first frequency channel in the receiver of the second frequency channel.

Determining the estimated channel may include sending a first clear-to-send (CTS) on the first channel, sending a second CTS on the second channel, sending a short packet on the first channel, receiving the short packet on the second channel, and processing the received short packet and transmitted short packet. Processing the received short packet and the transmitted short packet may include taking the ratio of the frequency domain response of the received short packet and a frequency shifted version of the transmitted short packet. The short packet may include training symbols. The training symbols may be Institute of Electrical and Electronics Engineers (IEEE) 802.11 standard Long Training Fields (LTFs).

Cancelling the interference may include determining an estimated aliased signal by convolving the frequency shifted transmitted packet with the estimated channel, and may further include subtracting the estimated aliased signal from the received second signal.

The first signal may be transmitted on a first VHT channel first basic channel. The second signal may be received on a second VHT channel first basic channel. Reducing aliasing may include instructing a second wireless device configured to receive the first signal on the first VHT channel first basic channel to receive the first signal on a first VHT channel second basic channel and transmitting the first signal on the first VHT channel second basic channel to the second wireless device. In another configuration, reducing aliasing may include instructing a second wireless device configured to transmit the second signal on the second VHT channel first basic channel to transmit the second signal on a second VHT channel second basic channel and receiving the second signal on the second VHT channel second basic channel from the second wireless device.

Reducing aliasing may include adjusting the sampling rate for an analog-to-digital convertor (ADC). The aliasing may be caused by analog-to-digital convertor (ADC) sampling.

A wireless device configured for detecting and reducing aliasing is also disclosed. The wireless device includes a processor and circuitry coupled to the processor. The circuitry is configured to transmit a first signal on a first frequency channel and receive a second signal on a second frequency channel. The second signal is received concurrently with the transmission of the first signal. The circuitry is also configured to detect aliasing of the first signal on the second signal and reduce the aliasing. Examples of wireless devices include an access point and a subscriber station.

An apparatus that is configured for detecting and reducing aliasing is also disclosed. The apparatus includes means for transmitting a first signal on a first frequency channel and means for receiving a second signal on a second frequency channel. The second signal is received concurrently with the transmission of the first signal. The apparatus also includes means for detecting aliasing of the first signal on the second signal and means for reducing aliasing.

A computer-program product for detecting and reducing aliasing is also disclosed. The computer-program product includes a computer-readable medium having instructions thereon. The instructions include code for transmitting a first signal on a first frequency channel and code for receiving a second signal on a second frequency channel. The second signal is received concurrently with the transmission of the first signal. The instructions also include code for detecting aliasing of the first signal on the second signal and code for reducing aliasing.

There are approximately twenty-four 20 megahertz (MHz) frequency channels in the 5 gigahertz (GHz) spectrum that may be used for WLAN communications. Multi-channel modems that can operate over multiple 20 MHZ frequency channels may be attractive for 802.11ac. The 5 GHz spectrum plan for the United States is illustrated below in Table 1.

TABLE 1

| Frequency | Channel Number | Transmit Frequency | Maximum Transmit Power | Potential Radar |
|---|---|---|---|---|
| U-NII lower band | 36 | 5.180 GHz | 50 mW Tx Power; 23 dBm EIRP | No |
|  | 40 | 5.200 GHz | | |
|  | 44 | 5.220 GHz | | |
|  | 48 | 5.240 GHz | | |
| U-NII middle band | 52 | 5.260 GHz | 250 mW TxPower; 30 dBm EIRP | Yes |
|  | 56 | 5.280 GHz | | |
|  | 60 | 5.300 GHz | | |
|  | 64 | 5.320 GHz | | |
| U-NII middle-upper band | 12 channels | 5.47-5.725 GHz | 250 mW | |
| U-NII upper band | 149 | 5.745 GHz | 1000 mW Tx Power; | No |
|  | 153 | 5.765 GHz | | |

TABLE 1-continued

| Frequency | Channel Number | Transmit Frequency | Maximum Transmit Power | Potential Radar |
|---|---|---|---|---|
|  | 157 | 5.785 GHz | 36 dBm EIRP | |
|  | 161 | 5.805 GHz | | |

Each station may use up to approximately 24 frequency channels. A client such as a subscriber station may have a smaller multichannel capability compared to an access point. An access point may typically use up to four 20 MHz channels. In contrast, a client may use any one of the 20 MHz channels. Each 20 MHz channel may be referred to as a basic channel.

FIG. 1 illustrates a system 100 including an access point 102 in wireless electronic communication with multiple subscriber stations 104. The access point 102 may be a base station. The subscriber stations 104 may be mobile stations such as mobile phones and wireless networking cards.

The access point 102 may communicate with each of the subscriber stations 104. For example, the access point 102 may send data to the subscriber stations 104 over a downlink transmission. Similarly, the subscriber stations 104 may send data to the access point 102 over an uplink transmission. The subscriber stations 104 may receive transmissions from the access point 102 that are not directed to the specific subscriber station 104. For example, the access point 102 may send a downlink transmission to a first subscriber station 104a that may also be received by a second subscriber station 104b. Similarly, subscriber stations 104 may receive uplink transmissions from other subscriber stations 104 that are not directed to the other subscriber stations 104. For example, the second subscriber station 104b may send an uplink transmission to the access point 102 that may also be received by the first subscriber station 104a.

The access point 102 may send transmissions to the first subscriber station 104a over a first frequency channel 106. For example, the access point 102 may send transmissions to the first subscriber station 104a over frequency channel A. The access point 102 may receive transmissions from the second subscriber station 104b over a second frequency channel 108. For example, the access point 102 may receive transmissions from the second subscriber station 104b over frequency channel B.

One or more contiguous basic channels may collectively be referred to as a VHT channel. For example, a VHT channel may be 80 MHz wide having four 20 MHz channels. It may be assumed that a modem can either transmit synchronously across one or more basic channels in a VHT channel, or receive synchronously across one or more basic channels in a VHT channel. In other words, a modem cannot transmit on one basic channel and receive on another basic channel within a single given VHT channel. This is because of radio frequency (RF) considerations as explained in further detail below in relation to FIG. 3.

The 802.11n standard describes a procedure for a modem to transmit synchronously on a 40 MHz channel (i.e. two contiguous 20 MHz channels). For this procedure, a modem may sense the 40 MHz channel for a point coordination function (PCF) inter frame space (PIFS) (approximately 25 microseconds). If no transmissions are detected (i.e. the channel is free), the modem may transmit data on the 40 MHz channel. This may be referred to as the PIFS access procedure. A modem may employ the PIFS access procedure to transmit a signal across all basic channels in a VHT channel.

The access point 102 may asynchronously transmit and receive across multiple VHT channels simultaneously in the 5 GHz spectrum.

VHT channels may be separated in bandwidth to guard against channel de-sensing. In a given multi-channel modem, the transmitter in one VHT channel may transmit signals at 20 dBm (decibels referenced to one milliwatt). The receiver in another VHT channel may simultaneously receive signals at −90 dBm. In such a situation, the transmit signal may leak into the receiver and saturate the receiver front end, creating receiver distortion. This effect is called channel de-sensing. Typically, channel de-sensing may be alleviated by sufficient RF filtering and antenna isolation between transmit and receive modems. To guard against channel de-sensing, VHT channels may be separated by a bandwidth separation of approximately 100 MHz. The exact bandwidth separation may be determined by design constraints. For example, the exact bandwidth separation may depend on the costs and capabilities of RF filters that are employed at the transmitter and the receiver to create isolation.

In addition to channel de-sensing, the transmit signal may also alias into the receiver signal after analog to digital conversion. This may also create distortion. Techniques to mitigate this aliasing problem referred to as the self-interference problem may be performed.

A subscriber station 104 may be restricted to using only a subset of VHT channels used by the access point 102. For example, a subscriber station 104 may be restricted to using only a single VHT channel.

Figure 2:
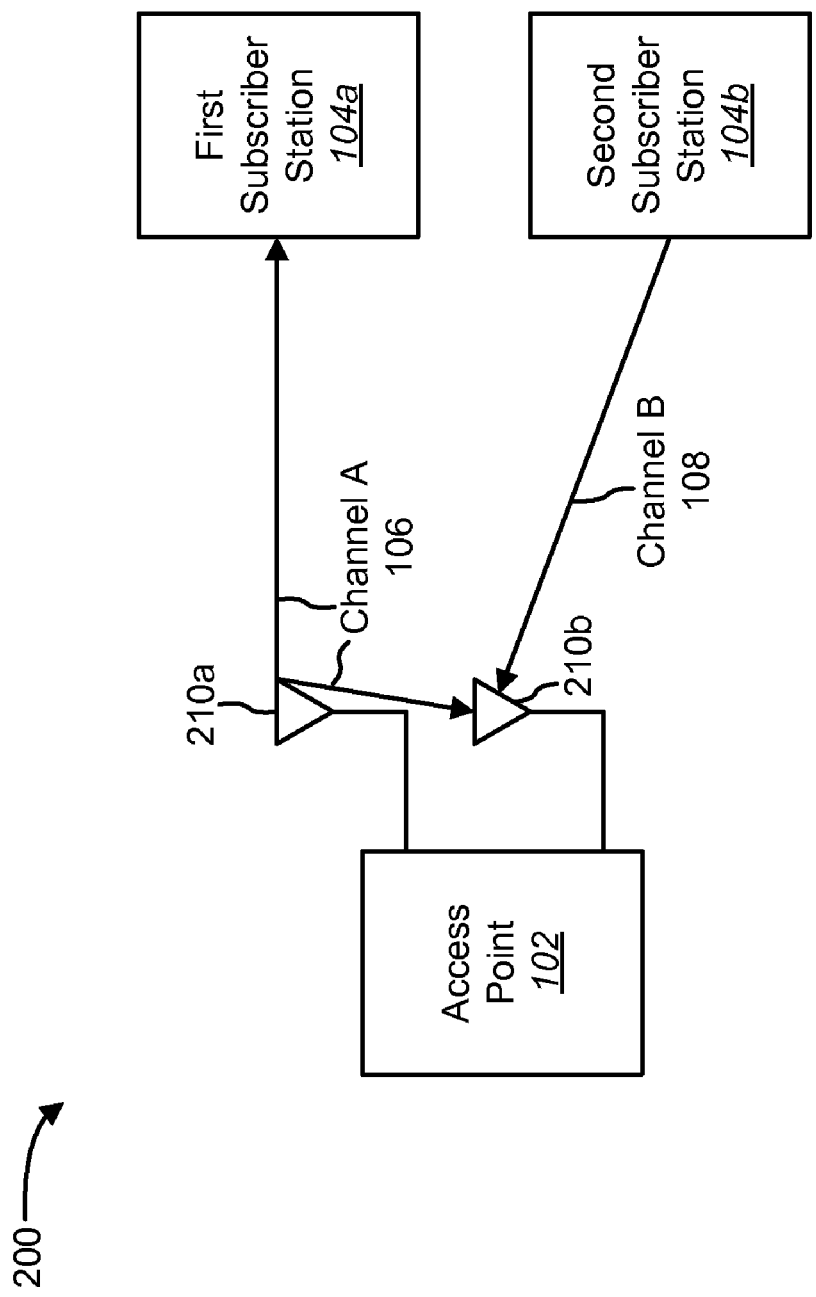
FIG. 2 illustrates a system including an access point in wireless electronic communication with multiple subscriber stations, where aliasing may occur.

FIG. 2 illustrates a system 200 including an access point 102 in wireless communication with multiple subscriber stations 104 where aliasing may occur. The access point 102 may use a first antenna 210a to transmit signals to the first subscriber station 104a on the first channel 106, which is referred to as channel A. The access point 102 may use a second antenna 210b to receive signals from the second subscriber station 104b on the second channel 108, which is referred to as channel B. Channel A and channel B are on different VHT channels. Both the transmitter and the receiver on the access point 102 may include a bulk acoustic wave (BAW) filter. A BAW filter is a type of passband RF filter, with the transmit or receive frequency as the center frequency. The front end architecture for a single input single output (SISO) access point 102 is discussed in further detail below in relation to FIG. 4.

ADC sampling may cause aliasing of transmit frequency channels from other bands. For example, ADC sampling may cause aliasing of the transmit channel A image on to the receive channel B. Aliasing of a channel A image on to channel B may occur if the spectral content of channel B is in the range as shown by Equation (1), as follows:

$$fc +/- [n*fs - W_A/2, n*fs + W_A/2] \quad (1)$$

where n=0, 1, 2 . . . , fs is the ADC sampling rate, $W_A$ is the bandwidth of Channel A, and fc is the center frequency of channel A with respect to channel B.

Figure 3:
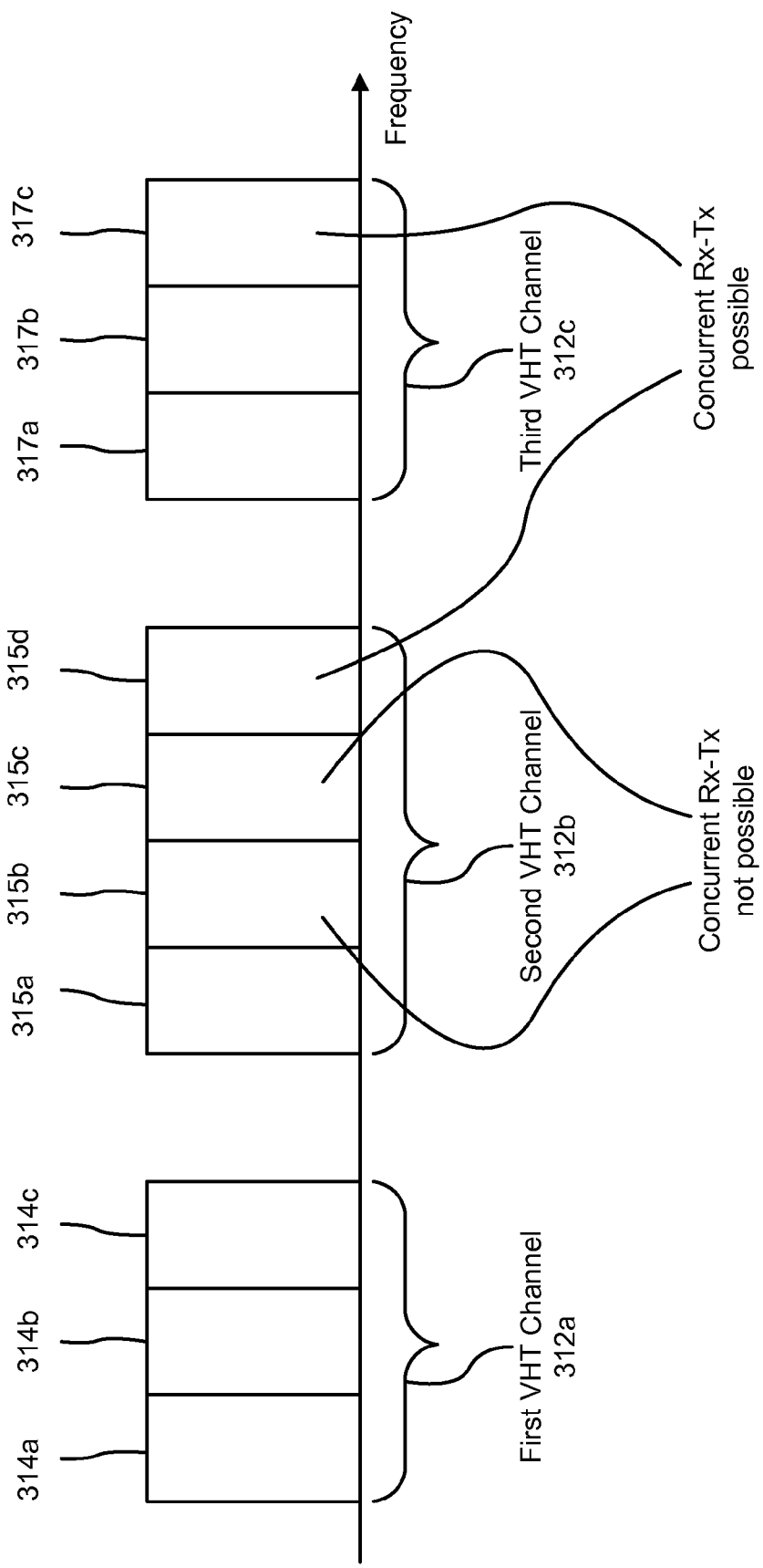
FIG. 3 illustrates an example of a VHT channel configuration.

FIG. 3 illustrates examples of VHT channel 312 configurations. Each VHT channel 312 may include one or more adjacent basic channels. Each basic channel may be a 20 MHz channel. For example, a first VHT channel 312a may include three adjacent 20 MHz basic channels, a first VHT channel first basic channel 314a, a first VHT channel second basic channel 314b, and a first VHT channel third basic channel 314c. As another example, a second VHT channel 312b may include four adjacent 20 MHz basic channels, a second VHT channel first basic channel 315a, a second VHT channel second basic channel 315b, a second VHT channel third basic channel 315c, and a second VHT channel fourth basic channel 315d. As another example, a third VHT channel 312c may include three adjacent 20 MHz basic channels, a third VHT channel first basic channel 317a, a third VHT channel second basic channel 317b, and a third VHT channel third basic channel 317c.

As discussed above, an access point 102 or a modem may transmit and receive concurrently on different VHT channels. For example, the access point 102 may receive on the first VHT channel first basic channel 314a while concurrently transmitting on the second VHT channel first basic channel 315a. Concurrent transmission and reception by the access point 102 may be possible if the access point 102 transmits on a basic channel that is part of a different VHT channel 312 than the channel the access point 102 is concurrently receiving on (e.g., transmitting on a basic channel 314 of the first VHT channel 312a while receiving on a basic channel 315 of the second VHT channel 312b). Concurrent transmission and reception may not be possible if transmission and reception occur on basic channels that are both part of the same VHT channel 312 (e.g., attempting to transmit on the first basic channel 314a of the first VHT channel 312a and attempting to receive on the second basic channel 314b of the first VHT channel 312a).

The bandwidth for each VHT channel 312 may be dependent on the cost of the radio frequency (RF) bulk acoustic wave (BAW) filters. If a VHT channel 312 includes three basic channels, the bandwidth of the VHT channel 312 may be 60 MHz. Likewise, if a VHT channel 312 includes five basic channels, the bandwidth of the VHT channel 312 may be 100 MHz.

Due to RF front-end limitations, a subscriber station 104 and/or an access point 102 that is transmitting on one or more basic channels within a VHT channel 312 may be unable to listen to the other basic channels within the same VHT channel 312. This may be due to the channel de-sensing of the basic channel in receive mode. Furthermore, a subscriber station 104 and/or an access point 102 may be unable to monitor the network allocation vectors (NAVs) on multiple basic channels within the same VHT channel 312, which may limit subsequent throughput gains because the access point 102 would be deaf on secondary channel traffic while transmitting on the primary channel. This may be due to the large power imbalance of packets received from different users on different basic channels, necessitating a prohibitively high 17 bits of ADC. To transmit on one VHT channel 312a while simultaneously receiving on another VHT channel 312b, front-end (RF) BAW filtering may be necessary. Due to cost considerations, access points 102 may be more likely to support a larger number of VHT channels 312 than clients. The capability of the access point 102 to transmit and receive simultaneously may incur additional RF filtering costs and requirements.

Figure 4:
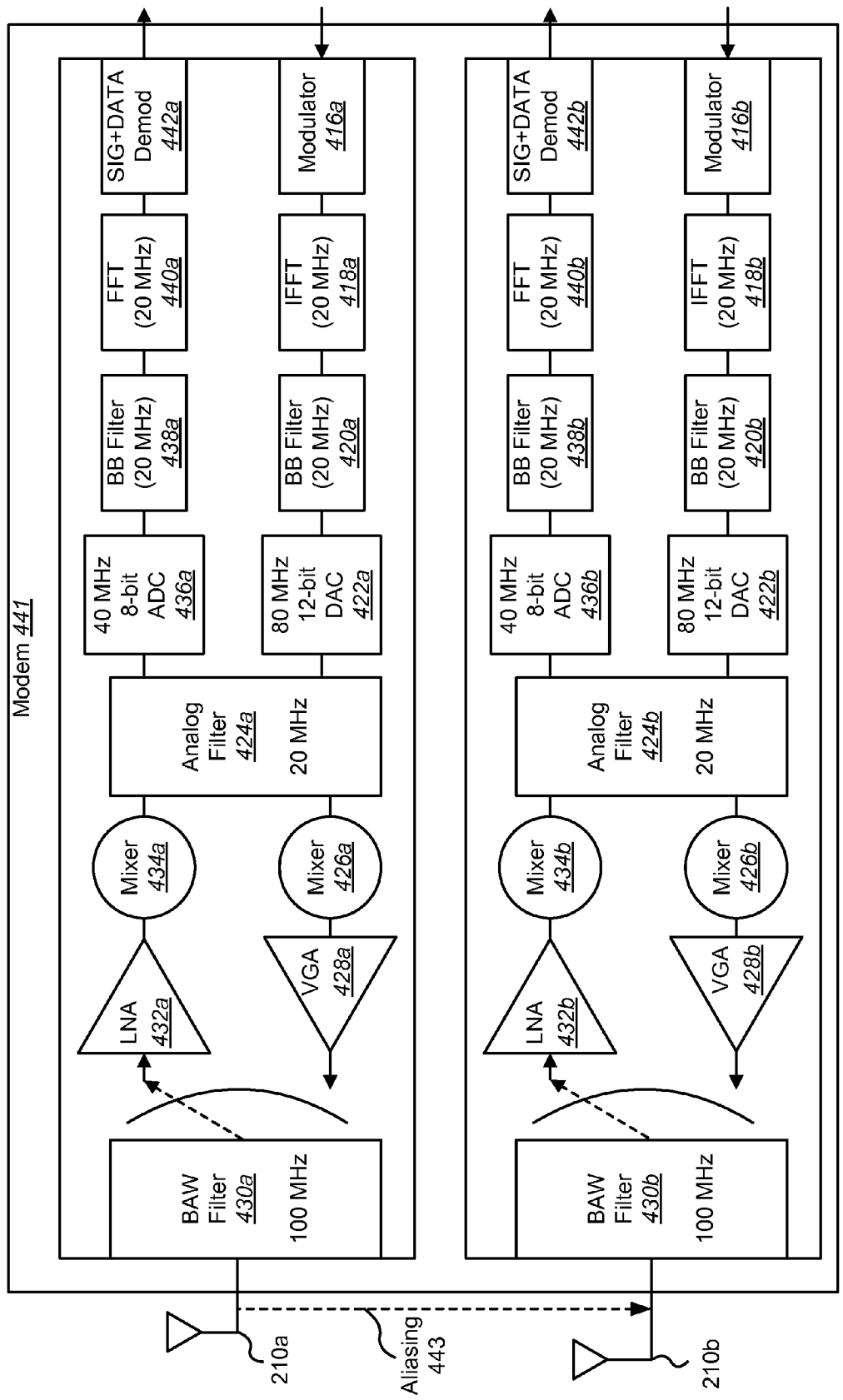
FIG. 4 is a block diagram illustrating the front-end architecture for an access point.

FIG. 4 is a block diagram illustrating a configuration of the front-end architecture for a modem 441. The modem 441 may be part of a wireless device such as an access point. The modem 441 may be operating in a single input single output (SISO) mode. It may be assumed for purposes of FIG. 4 that each VHT channel is 20 MHz, and that the transmitter is operating on channel A, whereas the receiver is operating on channel B. A transmission signal stream may be sent through a modulator 416a, 416b to module the signal in order to prepare the signal stream for conveying a message. An inverse fast Fourier transform (IFFT) 418a, 418b may convert the signal stream from the frequency domain to the time domain. A baseband filter 420a, 420b may filter out the undesired high frequency images. A digital-to-analog convertor (DAC)

422a, 422b may convert the digital signal stream to an analog signal stream and an analog filter 424a, 424b may provide additional filtering to the signal stream to further reduce the higher frequency images.

A mixer 426a, 426b may convert the analog baseband signal to RF frequencies. A variable gain amplifier (VGA) 428a, 428b may maintain a desired output signal level by controlling the gain of the signal stream. Finally, the signal stream may be passed through a Bulk Acoustic Wave (BAW) filter 430a, 430b before being transmitted by an antenna 210a, 210b. The BAW filter is an RF passband filter at the center frequency of channel A with a stopband that further suppresses the high frequency images, so that the images are well below the noise floor (approximately −90 dBm) of the receiver for channel B.

Similarly, a received signal stream from an antenna 210a, 210b may be sent through a BAW filter 430a, 430b. If the transmitter signal power on channel A is 20 dBm, a 40 dB suppression achieved by the BAW filter 430a, 430b may result in the transmit signal power of channel A leaking on to the channel B receiver of −20 dBm. This signal level is below the saturation region of the Low-Noise Amplifier (LNA) 432a, 432b at the RF front-end of the channel B receiver.

The LNA 432a, 432b may amplify weak signals captured by the antenna 210a, 210b. A mixer 434a, 434b may then convert the RF signal to baseband signals. An analog filter 424a, 424b may provide further suppression of the channel A transmitter signals leaking into the channel B receiver. An ADC (analog-to-digital converter) 436a, 436b converts the signal from analog to digital. A baseband filter 438a, 438b provides further baseband filtering of channel A transmit signals leaking into the channel B receiver. A fast Fourier transform (FFT) 440a, 440b converts the signal stream from the time domain to the frequency domain, and the time demodulation engine 442a, 442b demodulates the resulting signal. Channel A and channel B may require a separate physical antenna 210 with 2-3 lambda spacing to ensure approximately 20 dB of isolation. The BAW filter 430 may provide approximately 40 dB of isolation. The analog filter 424 may provide approximately 50 dB of isolation. Despite all the analog and digital filtering described above, ADC sampling at the receiver may cause the leaked signal from channel A to alias 443 into the passband of channel B. This can severely limit the receiver performance at channel B.

The signal strength of the transmitted signals on the first channel 106 (channel A) may be much greater than the signal strength of the received signals on the second channel 108 (channel B). For example, the modem 441 may transmit a signal stream on channel A at 20 dBm and receive a packet on channel B at −90 dBm (with approximately 0 dB signal-to-noise ratio (SNR)). If the BAW filter rejection is 40 dB (decibels) for each BAW filter 430, the receiver on channel B may see channel A signal power (leaked into receiver B) at −20 dBm. If an additional antenna isolation of 20 dB is included, the channel A signal power that leaks into channel B may be −40 dBm. The image power may be in the linear range of the low noise amplifier (LNA) 432 and mixer 434 (i.e. no harmonics or non-linearities are created). If the tunable analog filter rejection is 50 dB, the receiver on channel B may see a further suppression of channel A signal power that leaks into channel B to be at −90 dBm. The adjustable analog filter bandwidth, the digital filter bandwidth, and the FFT/IFFT (fast Fourier transform/inverse fast Fourier transform) bandwidth may each be a multiple of 20 MHz. The channel bandwidth may be different for different bands. For example, the channel bandwidth may be 20 MHz in a lower band and 40 MHz in the middle band.

With an additional 1-bit ADC (analog-to-digital converter) 436 overhead (9 bit ADC), the modem 441 may accommodate transmit signals that leak into channel B from three transmit channels. A tunable analog filter 424 may be controlled to have different bandwidths. The digital baseband (BB) filter 438 may provide an additional 15 dB of out-of-band rejection and signal shaping.

Figure 5:
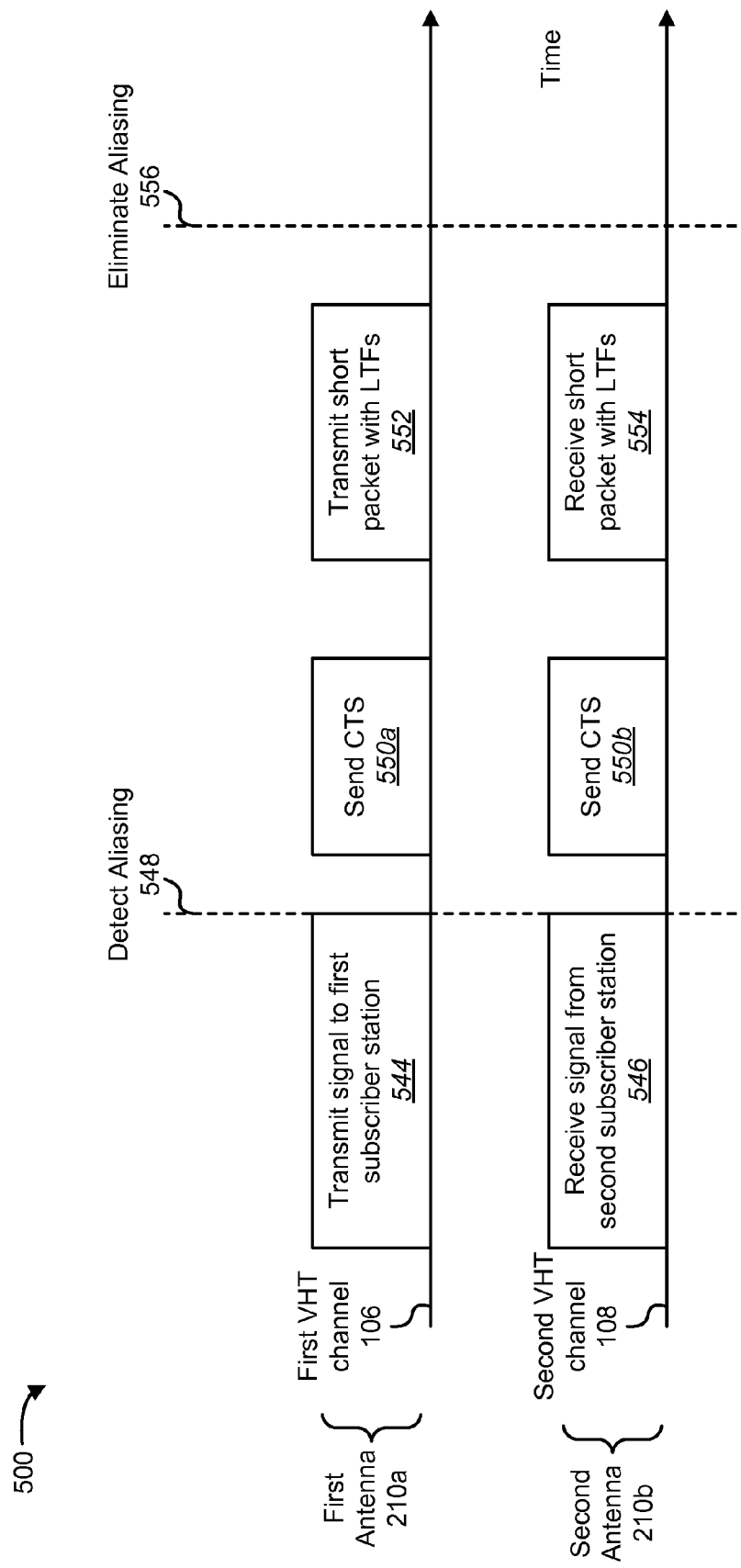
FIG. 5 is a block diagram illustrating the transmission schemes of two antennas on an access point using two VHT channels.

FIG. 5 is a block diagram illustrating the transmission schemes 500 of two antennas 210 on an access point 102 using two VHT channels 312. A first antenna 210a may use a first VHT channel 106 to transmit 544 a signal from the access point 102 to a first subscriber station 104a, and a second antenna 210b may use a second VHT channel 108 to receive 546 a signal from a second subscriber station 104b. The first antenna 210a may transmit 544 signals to the first subscriber station 104a while the second antenna 210b simultaneously receives 546 signals from the second subscriber station 104b.

Based on the center frequencies of the first and second VHT channels, as well as the channel bandwidths and ADC sampling frequencies, the access point 102 may detect 548 aliasing of the first VHT channel 106 transmissions on the signals received on the second VHT channel 108. Upon detection of aliasing, the access point 102 may send 550 a clear-to-send (CTS) on both the first VHT channel 106 and the second VHT channel 108. The CTS may clear the first VHT channel 106 and the second VHT channel 108 from interference caused by other modems. The access point 102 may then transmit 552 a short packet with long training fields (LTFs) on the first VHT channel 106 using the first antenna 210a. For example, the access point 102 may transmit 552 a packet of 10 orthogonal frequency division multiplexing (OFDM) symbols. The second antenna 210b may receive 554 the short packet with LTFs on the second VHT channel 108. The access point 102 may use the received short packet with LTFs to estimate the channel from the first VHT channel 106 to the second VHT channel 108. The access point 102 may then eliminate 556 aliasing and return to transmitting 544 signals to the first subscriber station 104a on the first VHT channel 106 using the first antenna 210a and receiving 546 signals from the second subscriber station 104b on the second VHT channel 108 using the second antenna 210b. Different techniques for eliminating aliasing 556 will be described herein.

FIG. 6 is a flow diagram illustrating a method 600 for detecting and reducing aliasing. An access point 102 may transmit 602 a first signal on a first VHT channel 106 (channel A) and receive a second signal on a second VHT channel 108 (channel B) concurrently. The access point 102 may detect 604 aliasing of the first VHT channel 106 transmissions on the second VHT channel 108 received signals. As discussed above in relation to Equation (1), aliasing of a channel A image on to channel B may occur if the spectral content of channel B is in the range $fc+/-[n*fs-W_A/2, n*fs+W_A/2]$. The access point 102 may then reduce 606 and/or attempt to eliminate the detected aliasing using the techniques as described herein.

The present systems and methods may be implemented in various kinds of wireless devices, which include both access points 102 and subscriber stations 104. Although some of the systems and methods may be described as being part of an access point 102 or a subscriber station 104, it is to be understood that the systems and methods may be implemented in other wireless devices besides the particular configuration being described.

Figure 6A:
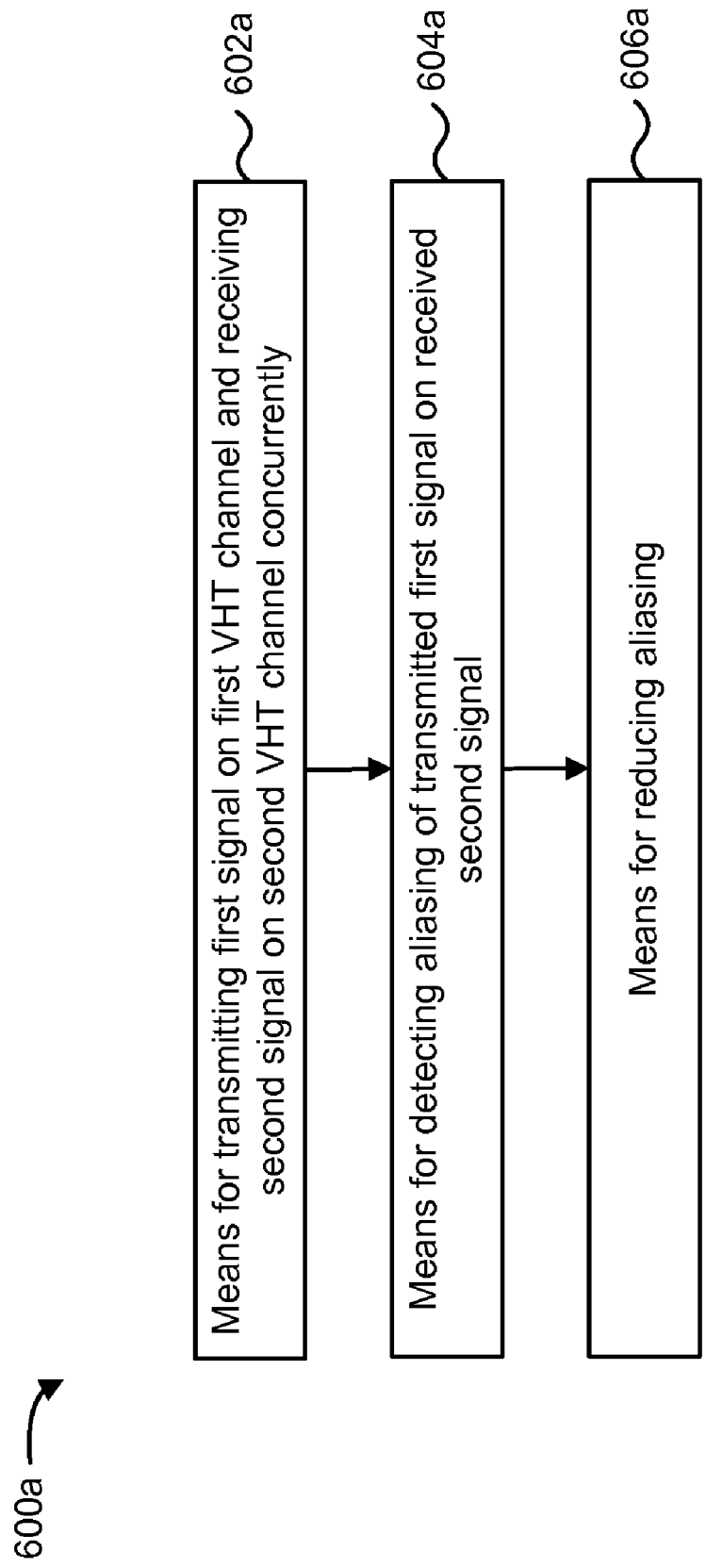
FIG. 6a illustrates means-plus-function blocks corresponding to the method of FIG. 6.

The method 600 of FIG. 6 described above may be performed by various hardware and/or software component(s) and/or module(s) corresponding to the means-plus-function blocks 600a illustrated in FIG. 6a. In other words, blocks 602 through 606 illustrated in FIG. 6 correspond to means-plus-function blocks 602a through 606a illustrated in FIG. 6a.

Figure 7:
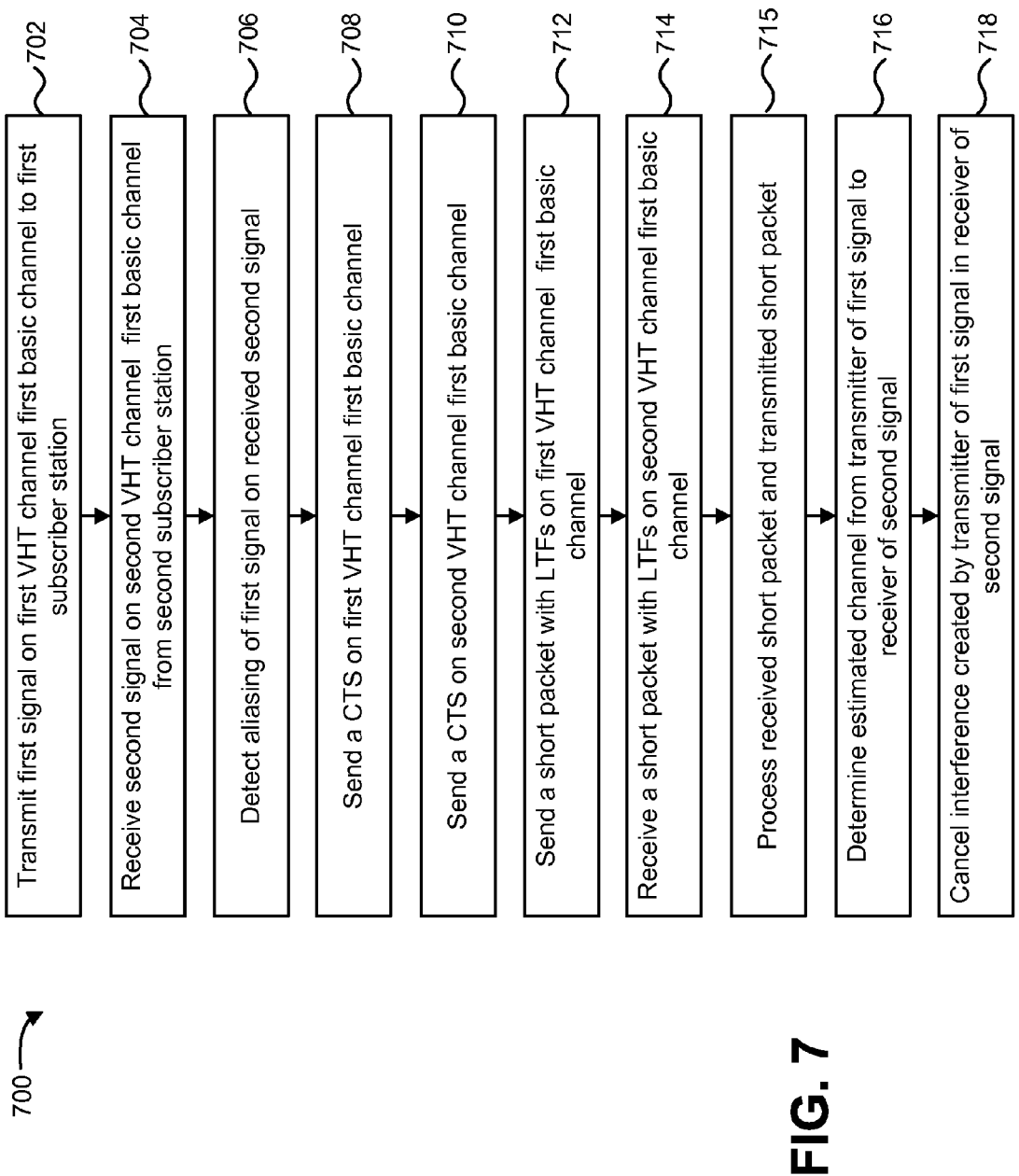
FIG. 7 is a flow diagram illustrating a method for detecting and reducing aliasing using self-interference cancellation.

FIG. 7 is a flow diagram illustrating a method 700 for detecting and reducing aliasing using self-interference cancellation. An access point 102 may transmit 702 a first signal on a first VHT channel first basic channel 314a to a first subscriber station 104a. The access point 102 may transmit 702 the first signal using a transmitter. The access point 102 may also receive 704 a second signal on a second VHT channel first basic channel 315a from a second subscriber station 104b. The access point 102 may receive 704 the second signal using a receiver. The access point 102 may transmit 702 the first signal while concurrently receiving 704 the second signal.

The access point 102 may detect 706 aliasing of the first signal (channel A) on the received second signal (channel B). As discussed above in relation to Equation (1), aliasing of a channel A image on to channel B may occur if the spectral content of channel A is in the range fc+/−[n*fs−$W_A$/2, n*fs+$W_A$/2]. The access point 102 may send 708 a CTS on the first VHT channel first basic channel 314a. The access point 102 may also send 710 a CTS on the second VHT channel first basic channel 315a. The CTS may clear both frequency channels from interference caused by other modems. The access point 102 may send 712 a short packet with LTFs on the first VHT channel first basic channel 314a. The access point 102 may receive 714 the short packet with LTFs on the second VHT channel first basic channel 315a. The access point 102 may process 715 the received short packet and the transmitted short packet. In one configuration the access point 102 may process 715 the received short packet and the transmitted short packet by taking the ratio of the frequency domain response of the received short packet and a frequency shifted version of the transmitted short packet.

The access point 102 may then determine 716 an estimated channel from the transmitter of the first signal to the receiver of the second signal. To perform channel estimation in calibration mode (i.e. to estimate the channel between the first VHT channel first basic channel 314a and the second VHT channel first basic channel 315a without interference), the receiver for the second VHT channel first basic channel 315a may be time-synchronized with the transmitter for the first VHT channel first basic channel 314a. The automatic gain control (AGC) on the receiver may be set to a nominal value. The channel estimates may be calculated using Equation (2):

$$H(f) = \sum_{k=1}^{K} \frac{Y_k(f)}{S_k\left(f - f_c \pm \frac{n}{T_s}\right)} \quad (2)$$

where k is the OFDM symbol index, f is the frequency, K is the maximum number of OFDM symbols, $Y_k(f)$ is the received signal, $T_s$ is the ADC sampling period, $f_c$ is the carrier frequency of the transmitted VHT channel 312 with respect to the received frequency channel, and n is an integer that results in $$f_c \pm \frac{n}{T_s}$$

falling within the first basic channel 314 of the second VHT channel 108. Only part of the transmitted VHT channel may alias into the received frequency channel. Although the channel estimation is illustrated as being calculated within the frequency domain, channel estimation may also be performed by time domain correlation at the output of the ADC 436. Each of the parameters may be known to the access point 102.

Once the channel estimates have been calculated, the access point 102 may cancel 718 and/or reduce the interference created by the transmitter of the first signal in the receiver of the second signal. The first VHT channel first basic channel 314a may be referred to as channel A and the second VHT channel first basic channel 315a may be referred to as channel B. If the received signal on the second VHT channel first basic channel 315a is $X_k(f)$ as given by Equation (3):

$$X_k(f) = \quad (3)$$
$$\left\{S_k\left(f - f_c \pm \frac{n}{T_s}\right)H(f)\right\}_{FromChannelA} + \{W_k(f)\}_{FromChannelB} + N_k(f)$$

where $W_k(f)$ is the received signal from other modems in channel B, $N_k(f)$ is the noise in channel B, and $S_k(f)$ is the known self-transmissions from channel A, then the self-interference can be canceled by the receiver for channel B using Equation (4):

$$X_k(f) \leftarrow X_k(f) - \left\{S_k\left(f - f_c \pm \frac{n}{T_s}\right)H(f)\right\}_{FromChannelA}. \quad (4)$$

In Equation (4), an estimated aliased signal is determined by convolving the frequency shifted transmitted packet with the estimated channel. The interference may then be canceled by subtracting the estimated aliased signal from the received second signal. If the ADC bit-width is increased (i.e. 12 bits), the requirements on BAW filters 430, analog filters 424, and antenna isolation may be reduced.

Figure 7A:
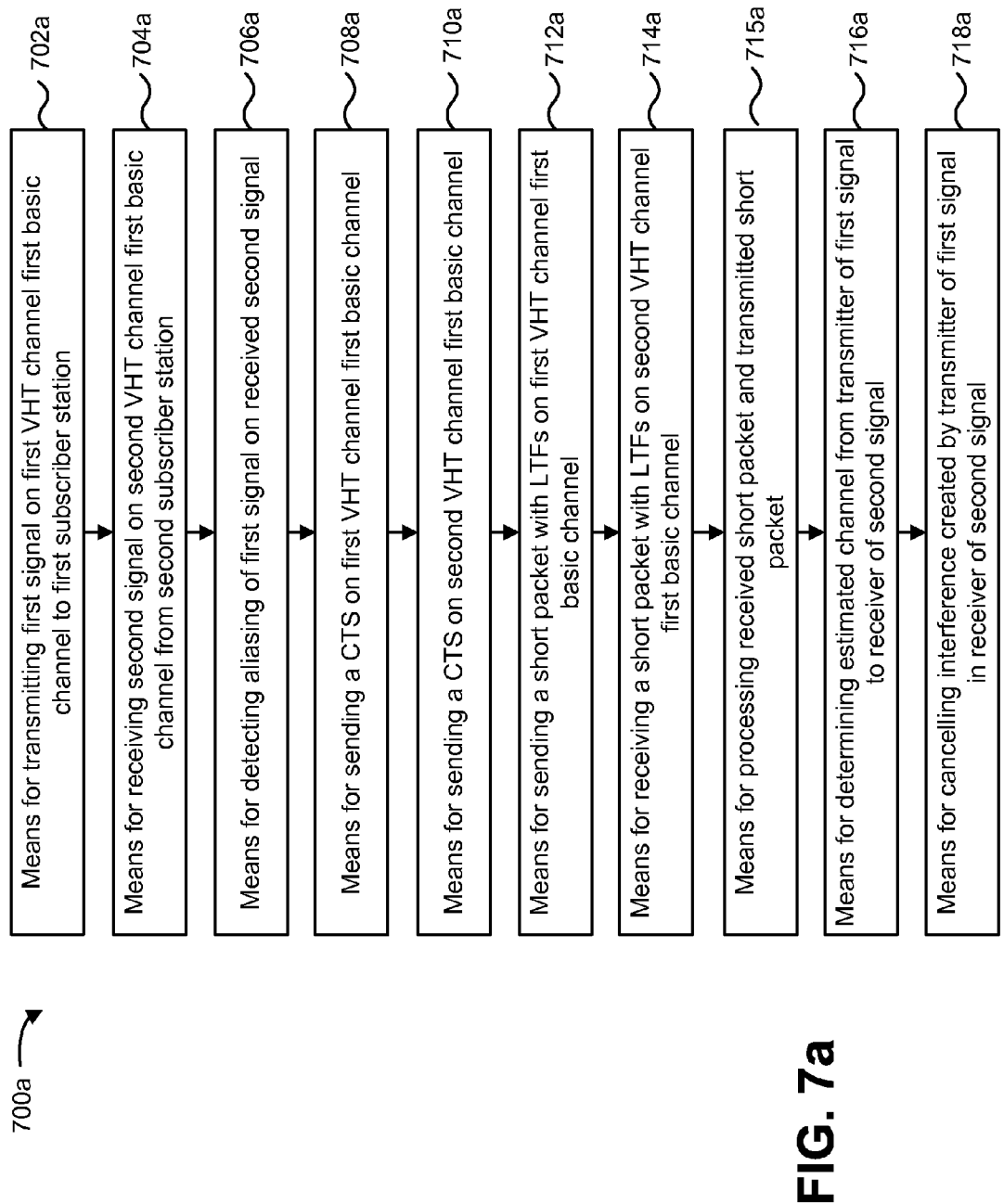
FIG. 7a illustrates means-plus-function blocks corresponding to the method of FIG. 7.

The method 700 of FIG. 7 described above may be performed by various hardware and/or software component(s) and/or module(s) corresponding to the means-plus-function blocks 700a illustrated in FIG. 7a. In other words, blocks 702 through 718 illustrated in FIG. 7 correspond to means-plus-function blocks 702a through 718a illustrated in FIG. 7a.

Figure 8:
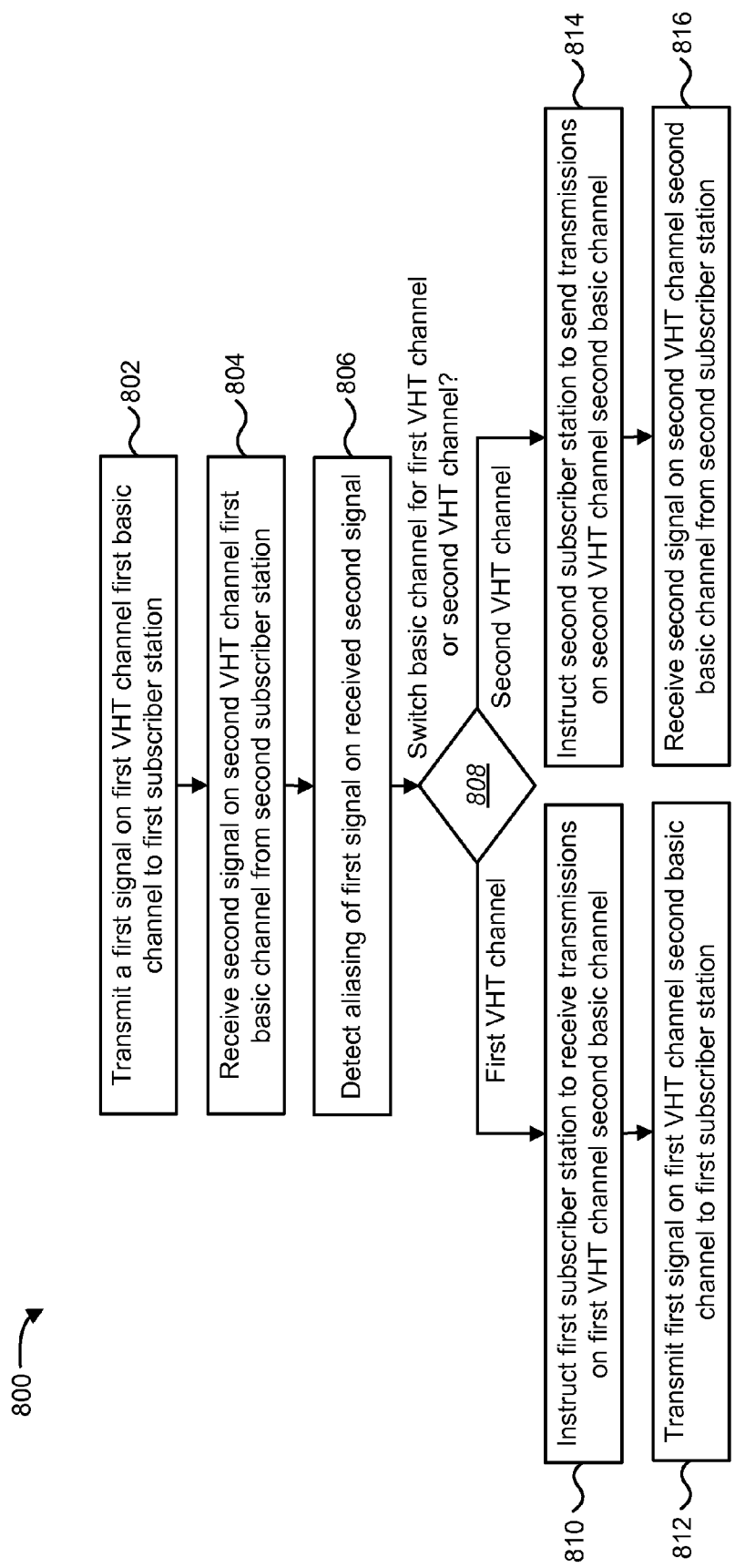
FIG. 8 is a flow diagram illustrating a method for detecting and eliminating aliasing by switching the basic channel used within a VHT channel.

FIG. 8 is a flow diagram illustrating a method 800 for detecting and reducing and/or eliminating aliasing by switching the basic channel used within a VHT channel 312. An access point 102 may transmit 802 a first signal on a first VHT channel first basic channel 314a to a first subscriber station 104a. The access point 102 may transmit 802 the first signal using a first antenna 210a. The access point 102 may also receive 804 a second signal on a second VHT channel first basic channel 315a from a second subscriber station 104b. The access point 102 may receive 804 the second signal using a second antenna 210b. The access point 102 may transmit 802 the first signal while concurrently receiving 804 the second signal.

The access point 102 may detect 806 aliasing of the first signal on the received second signal. If aliasing of the first signal on the received second signal is detected, the access point 102 may determine 808 whether to switch the basic channel 314 for the first VHT channel 312a or the basic channel 315 for the second VHT channel 312b. For example, the access point 102 may hop to a better channel in the band. The access point 102 may only switch to another basic channel if a free channel is available. If the access point 102 determines to switch the basic channel 314 for the first VHT channel 312a, the access point 102 may instruct 810 the first subscriber station 104a to receive transmissions on the first VHT channel second basic channel 314b. The access point 102 may then transmit 812 the first signal on the first VHT channel second basic channel 314b to the first subscriber station 104a.

If the access point 102 determines to switch the basic channel 315 for the second VHT channel 312b, the access point 102 may instruct 814 the second subscriber station 104b to send transmissions on the second VHT channel second basic channel 315b. The access point 102 may then receive 816 the second signal on the second VHT channel second basic channel 315b from the second subscriber station 104b.

Figure 8A:
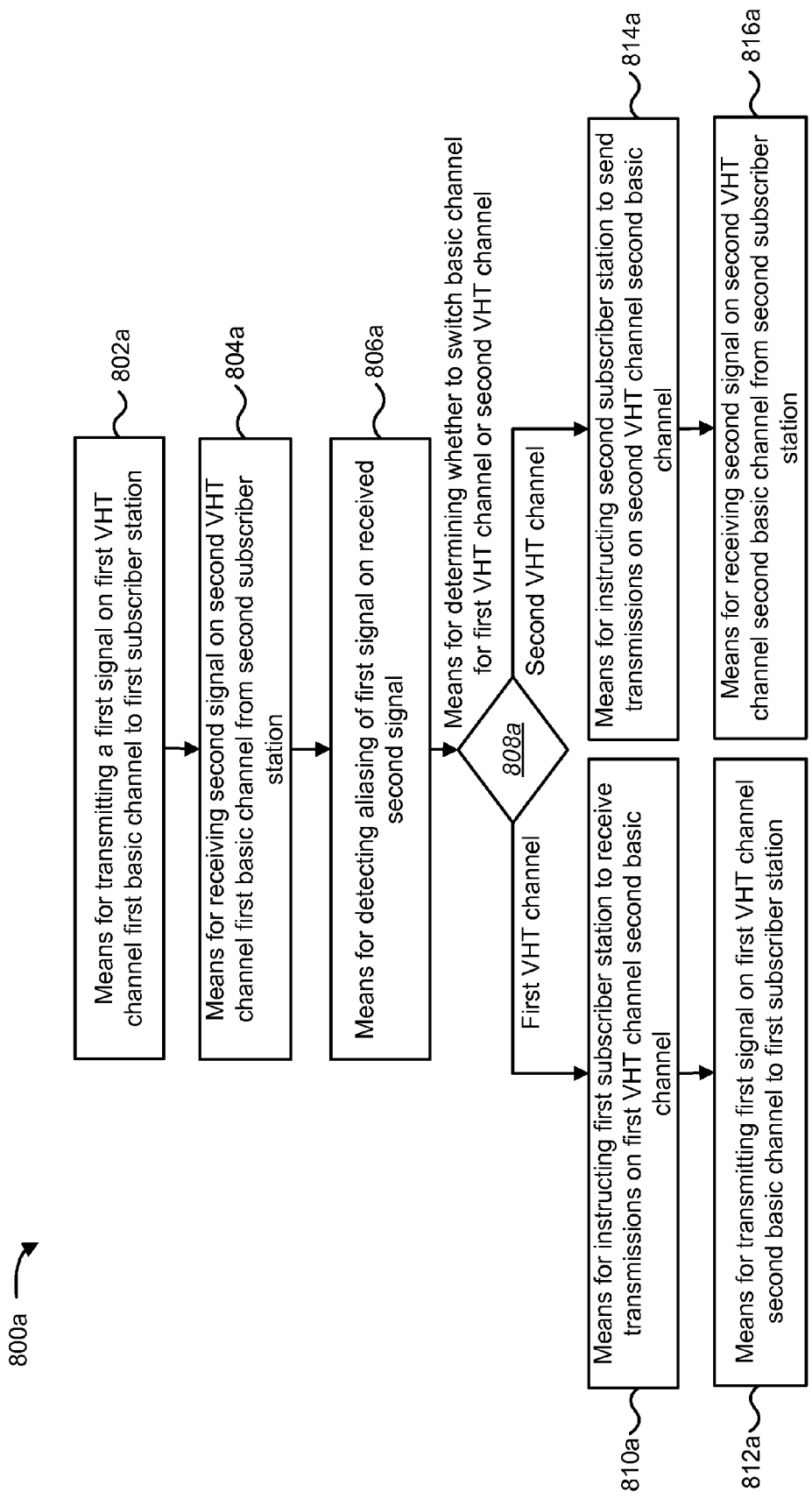
FIG. 8a illustrates means-plus-function blocks corresponding to the method of FIG. 8.

The method 800 of FIG. 8 described above may be performed by various hardware and/or software component(s) and/or module(s) corresponding to the means-plus-function blocks 800a illustrated in FIG. 8a. In other words, blocks 802 through 816 illustrated in FIG. 8 correspond to means-plus-function blocks 802a through 816a illustrated in FIG. 8a.

Figure 9:
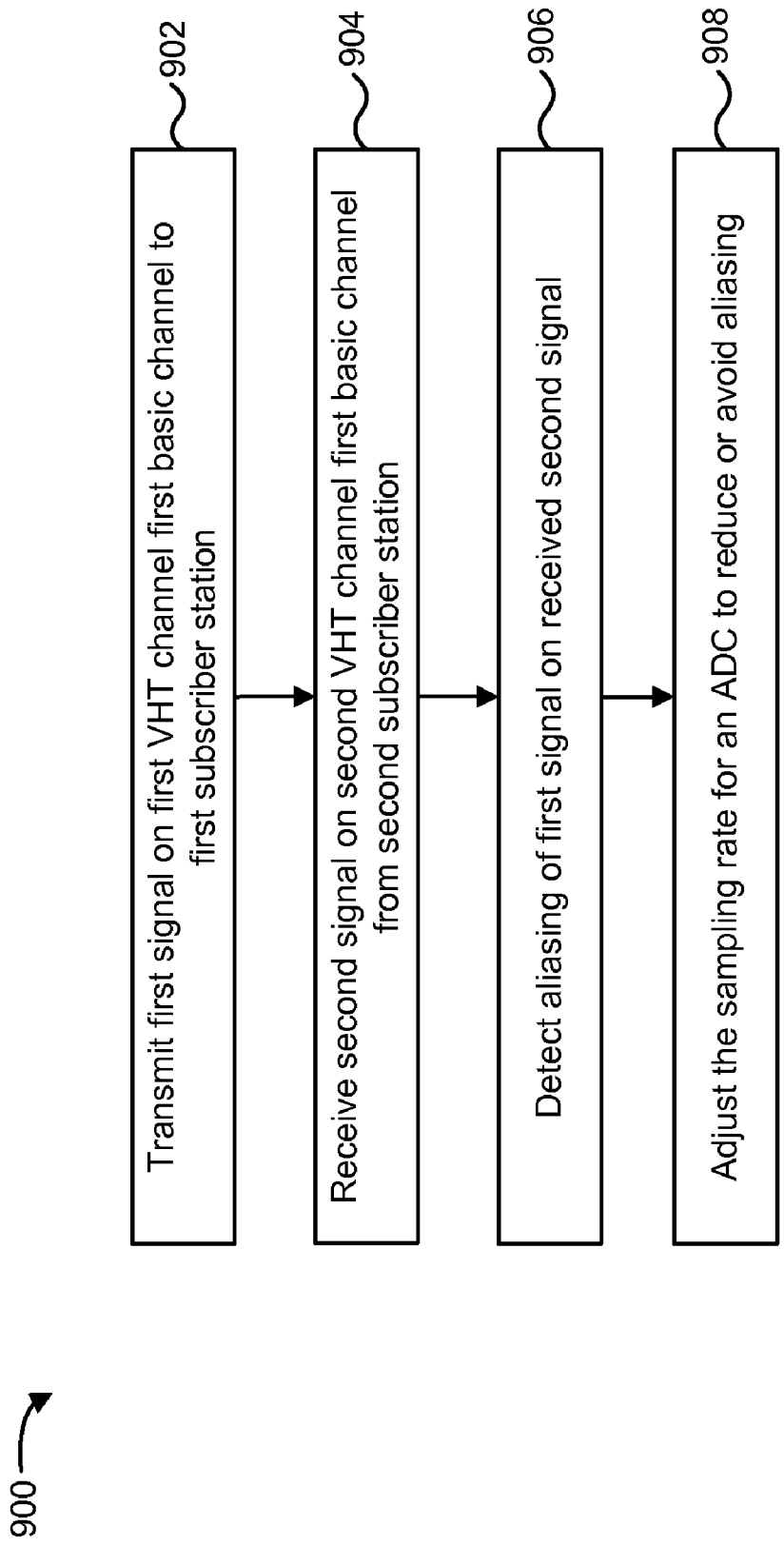
FIG. 9 is a flow diagram illustrating a method for detecting and reducing aliasing by adjusting the ADC sampling rate.

FIG. 9 is a flow diagram illustrating a method 900 for detecting and reducing and/or eliminating aliasing by adjusting the ADC sampling rate. The adjustable ADC sampling rate may be 40n MHz, where n is an integer. An access point 102 may transmit 902 a first signal on a first VHT channel first basic channel 314a to a first subscriber station 104a. The access point 102 may also receive 904 a second signal on a second VHT channel first basic channel 315a from a second subscriber station 104b. The access point 102 may transmit 902 the first signal while concurrently receiving 904 the second signal.

The access point 102 may detect 906 aliasing of the first signal on the received second signal. The access point 102 may adjust 908 the sampling rate of the ADC 436 to reduce or avoid the aliasing. Adjusting the sampling rate may require a generic resampler in the baseband (interpolation/decimation filter) so that the input to the FFT 440 is not affected. The upper bound on the sampling rate may limit the ability of the access point 102 to avoid aliasing.

Figure 9A:
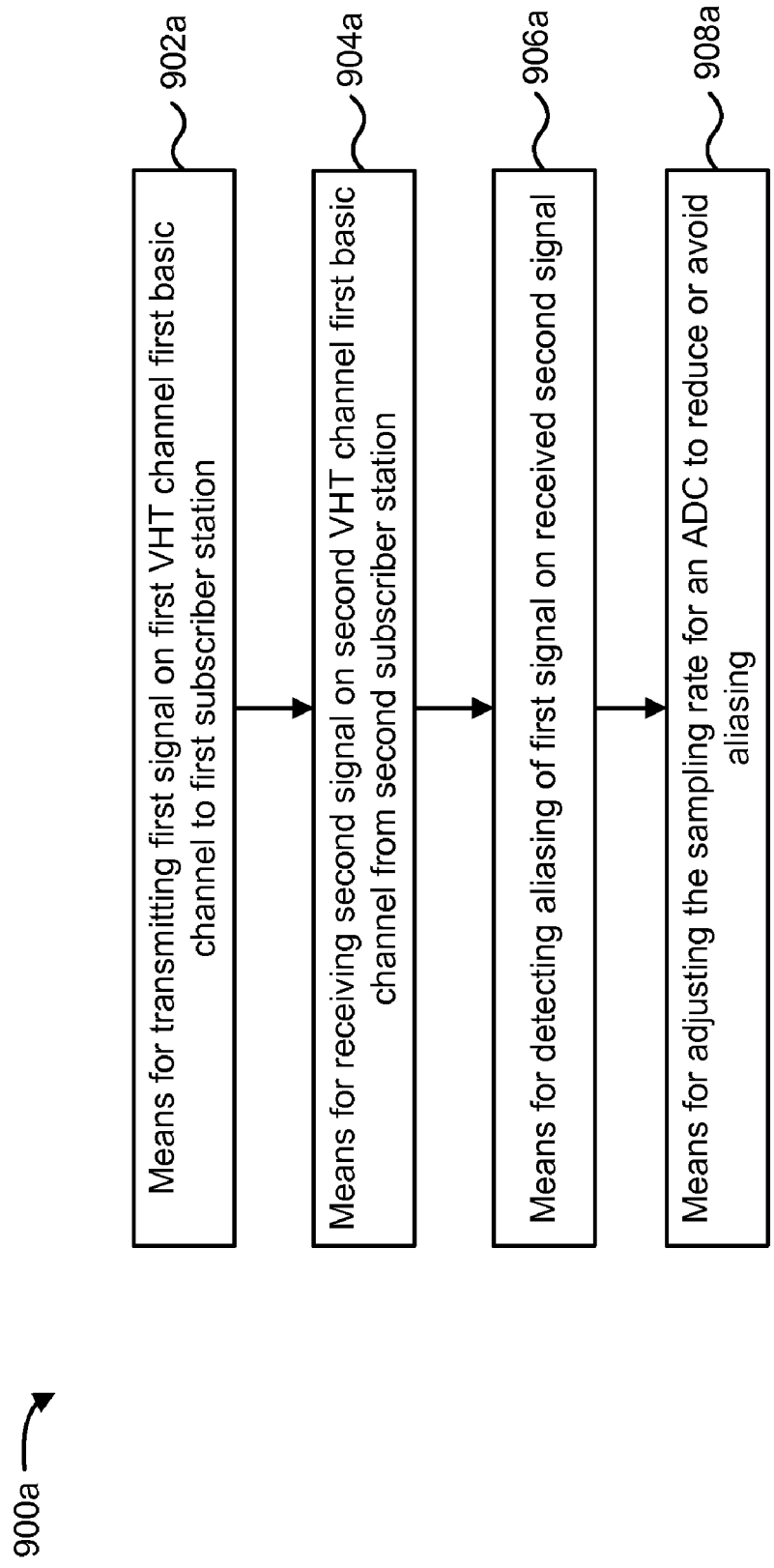
FIG. 9a illustrates means-plus-function blocks corresponding to the method of FIG. 9.

The method 900 of FIG. 9 described above may be performed by various hardware and/or software component(s) and/or module(s) corresponding to the means-plus-function blocks 900a illustrated in FIG. 9a. In other words, blocks 902 through 908 illustrated in FIG. 9 correspond to means-plus-function blocks 902a through 908a illustrated in FIG. 9a.

Figure 10:
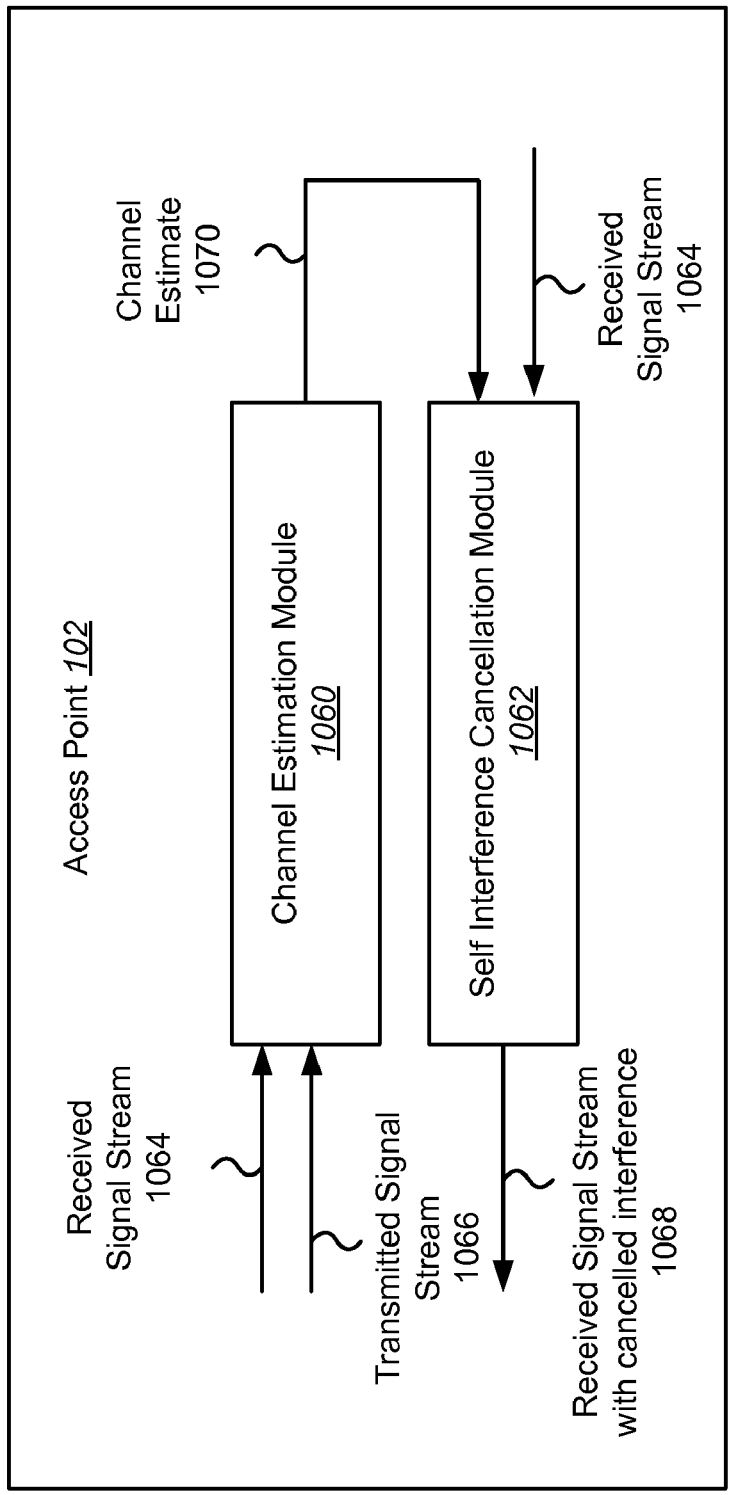
FIG. 10 is a block diagram illustrating the various components of an access point.

FIG. 10 is a block diagram illustrating various components of an access point 102. The access point 102 may include a channel estimation module 1060. The channel estimation module 1060 may estimate the channel between transmitting on a first VHT channel 106 and receiving on a second VHT channel 108 as described above. In other words, the channel estimation module 1060 may take a received signal stream 1064 and a transmitted signal stream 1066 to determine a channel estimate 1070. The access point 102 may also include a self-interference cancellation module 1062. The self-interference cancellation module 1062 may remove and/or reduce aliasing caused by ADC sampling as described above. The self-interference cancellation module 1062 may use the channel estimate 1070 to remove self interference from the received signal stream 1064. The self-interference cancellation module 1062 may output a received signal stream with cancelled interference 1068.

Figure 11:
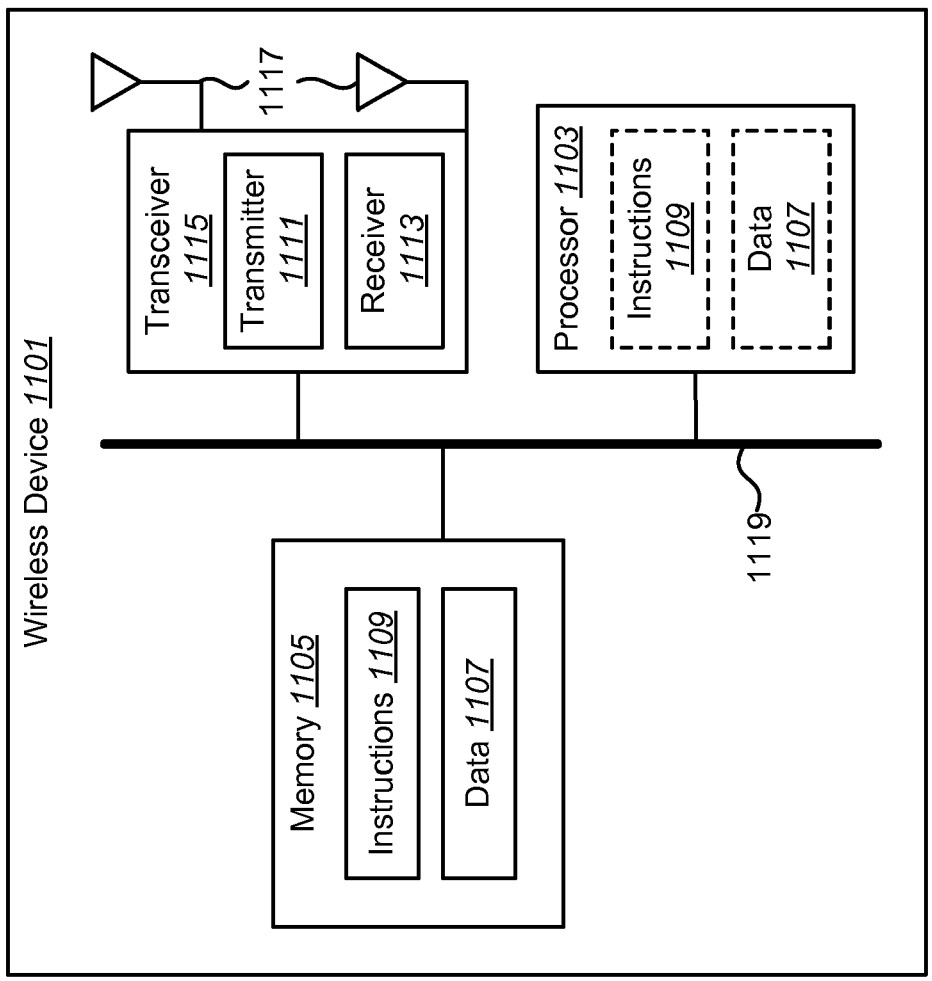
FIG. 11 illustrates certain components that may be included within a wireless device.

FIG. 11 illustrates certain components that may be included within a wireless device 1101. The wireless device 1101 may be any kind of wireless communications device. Examples of wireless devices 1101 include an access point 102 and a subscriber station 104. Further examples of wireless devices 1101 include, but are not limited to, a cell phone, a laptop computer, a wireless router, a wireless network card or modem, a personal digital assistant (PDA), etc.

The wireless device 1101 includes a processor 1103. The processor 1103 may be a general purpose single- or multi-chip microprocessor (e.g., an ARM), a special purpose microprocessor (e.g., a digital signal processor (DSP)), a microcontroller, a programmable gate array, etc. The processor 1103 may be referred to as a central processing unit (CPU). Although just a single processor 1103 is shown in the wireless device 1101 of FIG. 11, in an alternative configuration, a combination of processors (e.g., an ARM and DSP) could be used.

The wireless device 1101 also includes memory 1105. The memory 1105 may be any electronic component capable of storing electronic information. The memory 1105 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 1107 and instructions 1109 may be stored in the memory 1105. The instructions 1109 may be executable by the processor 1103 to implement the methods disclosed herein. Executing the instructions 1109 may involve the use of the data 1107 that is stored in the memory 1105.

The wireless device 1101 may also include a transmitter 1111 and a receiver 1113 to allow transmission and reception of signals between the wireless device 1101 and a remote location. The transmitter 1111 and receiver 1113 may be collectively referred to as a transceiver 1115. Multiple antennas 1117 may be electrically coupled to the transceiver 1115. The wireless device 1101 may also include (not shown) multiple transmitters, multiple receivers and/or multiple transceivers.

The various components of the wireless device 1101 may be coupled together by one or more buses, which may include a power bus, a control signal bus, a status signal bus, a data bus, etc. For the sake of clarity, the various buses are illustrated in FIG. 11 as a bus system 1119.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" and "computer-program product" refer to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 6, 7, 8, and 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for detecting and reducing aliasing, the method being implemented by a first wireless device, the method comprising:
    transmitting a first signal on a first frequency channel;
    receiving a second signal on a second frequency channel, wherein the second signal is received concurrently with the transmission of the first signal;
    detecting aliasing of the first signal on the second signal; and
    reducing the aliasing,
    wherein reducing aliasing comprises
    determining the estimated channel from a transmitter of the first frequency channel to a receiver of the second frequency channel, and
    cancelling the interference created by the transmitter of the first frequency channel in the receiver of the second frequency channel.

2. The method of claim 1, wherein the first frequency channel is a very high throughput (VHT) channel that comprises one or more basic channels.

3. The method of claim 1, wherein determining the estimated channel comprises:
    sending a first clear-to-send (CTS) on the first channel;
    sending a second CTS on the second channel;
    sending a short packet on the first channel;
    receiving the short packet on the second channel; and
    processing the received short packet and transmitted short packet.

4. The method of claim 3, wherein processing the received short packet and the transmitted short packet comprises taking the ratio of the frequency domain response of the received short packet and a frequency shifted version of the transmitted short packet.

5. The method of claim 1, wherein cancelling the interference comprises determining an estimated aliased signal by convolving the frequency shifted transmitted packet with the estimated channel, and further comprising subtracting the estimated aliased signal from the received second signal.

6. The method of claim 3, wherein the short packet comprises training symbols.

7. The method of claim 6, wherein the training symbols are Institute of Electrical and Electronics Engineers (IEEE) 802.11 standard Long Training Fields (LTFs).

8. The method of claim 1, wherein the first signal is transmitted on a first VHT channel first basic channel, and wherein the second signal is received on a second VHT channel first basic channel.

9. The method of claim 8, wherein reducing aliasing comprises:
   instructing a second wireless device configured to receive the first signal on the first VHT channel first basic channel to receive the first signal on a first VHT channel second basic channel; and
   transmitting the first signal on the first VHT channel second basic channel to the second wireless device.

10. The method of claim 8, wherein reducing aliasing comprises:
    instructing a second wireless device configured to transmit the second signal on the second VHT channel first basic channel to transmit the second signal on a second VHT channel second basic channel; and
    receiving the second signal on the second VHT channel second basic channel from the second wireless device.

11. The method of claim 1, wherein reducing aliasing comprises adjusting the sampling rate for an analog-to-digital convertor (ADC).

12. The method of claim 1, wherein the aliasing is caused by analog-to-digital convertor (ADC) sampling.

13. A wireless device that is configured for detecting and reducing aliasing, comprising:
    a processor; and
    circuitry coupled to said processor configured to:
       transmit a first signal on a first frequency channel;
       receive a second signal on a second frequency channel, wherein the second signal is received concurrently with the transmission of the first signal;
       detect aliasing of the first signal on the second signal; and
       reduce the aliasing,
       wherein reducing the aliasing comprises
    determining the estimated channel from a transmitter of the first frequency channel to a receiver of the second frequency channel, and
       cancelling the interference created by the transmitter of the first frequency channel in the receiver of the second frequency channel.

14. The wireless device of claim 13, wherein the first frequency channel is a very high throughput (VHT) channel that comprises one or more basic channels.

15. The wireless device of claim 13, wherein the circuitry is further configured to:
    send a first clear-to-send (CTS) on the first channel;
    send a second CTS on the second channel;
    send a short packet on the first channel;
    receive the short packet on the second channel; and
    process the received short packet and transmitted short packet.

16. The wireless device of claim 15, wherein processing the received short packet and the transmitted short packet comprises taking the ratio of the frequency domain response of the received short packet and a frequency shifted version of the transmitted short packet.

17. The wireless device of claim 13, wherein cancelling the interference comprises determining an estimated aliased signal by convolving the frequency shifted transmitted packet with the estimated channel, and wherein the circuitry is further configured to subtract the estimated aliased signal from the received second signal.

18. The wireless device of claim 15, wherein the short packet comprises training symbols.

19. The wireless device of claim 18, wherein the training symbols are Institute of Electrical and Electronics Engineers (IEEE) 802.11 standard Long Training Fields (LTFs).

20. The wireless device of claim 13, wherein the first signal is transmitted on a first VHT channel first basic channel, and wherein the second signal is received on a second VHT channel first basic channel.

21. The wireless device of claim 20, wherein reducing the aliasing comprises:
    instructing a second wireless device configured to receive the first signal on the first VHT channel first basic channel to receive the first signal on a first VHT channel second basic channel; and
    transmitting the first signal on the first VHT channel second basic channel to the second wireless device.

22. The wireless device of claim 21, wherein reducing the aliasing comprises:
    instructing a second wireless device configured to transmit the second signal on the second VHT channel first basic channel to transmit the second signal on a second VHT channel second basic channel; and
    receiving the second signal on the second VHT channel second basic channel from the second wireless device.

23. The wireless device of claim 13, wherein reducing the aliasing comprises adjusting the sampling rate for an analog-to-digital convertor (ADC).

24. The wireless device of claim 13, wherein the aliasing is caused by analog-to-digital convertor (ADC) sampling.

25. The wireless device of claim 13, wherein the wireless device is an access point.

26. The wireless device of claim 13, wherein the wireless device is a subscriber station.

27. An apparatus that is configured for detecting and reducing aliasing, comprising:
    means for transmitting a first signal on a first frequency channel;
    means for receiving a second signal on a second frequency channel, wherein the second signal is received concurrently with the transmission of the first signal;
    means for detecting aliasing of the first signal on the second signal; and
    means for reducing aliasing,
    wherein the means for reducing aliasing comprises
    means for determining the estimated channel from a transmitter of the first frequency channel to a receiver of the second frequency channel, and
    means for cancelling the interference created by the transmitter of the first frequency channel in the receiver of the second frequency channel.

28. A computer-program product for detecting and reducing aliasing, the computer-program product comprising a non-transitory computer-readable medium having instructions thereon, the instructions comprising:
    code for transmitting a first signal on a first frequency channel;

code for receiving a second signal on a second frequency channel, wherein the second signal is received concurrently with the transmission of the first signal;

code for detecting aliasing of the first signal on the second signal; and code for reducing aliasing, wherein the coded for reducing aliasing comprises code for determining the estimated channel from a transmitter of the first frequency channel to a receiver of the second frequency channel, and code for cancelling the interference created by the transmitter of the first frequency channel in the receiver of the second frequency channel.

* * * * *